(12) United States Patent
DiPaulo et al.

(10) Patent No.: US 11,909,783 B2
(45) Date of Patent: Feb. 20, 2024

(54) PROVIDING TRUST AND SAFETY FUNCTIONALITY DURING VIRTUAL MEETINGS

(71) Applicant: Zoom Video Communications, Inc., San Jose, CA (US)

(72) Inventors: Vanessa Badillo DiPaulo, Raleigh, NC (US); Josh Patrick Parecki, Woodlands, TX (US); Dun-Yi Wang, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/733,957

(22) Filed: Apr. 29, 2022

(65) Prior Publication Data

US 2023/0353606 A1 Nov. 2, 2023

(51) Int. Cl.
*H04L 65/403* (2022.01)
*H04L 65/1089* (2022.01)
*G10L 15/08* (2006.01)
*G06V 20/40* (2022.01)

(52) U.S. Cl.
CPC .......... *H04L 65/1089* (2013.01); *G06V 20/40* (2022.01); *G10L 15/08* (2013.01); *H04L 65/403* (2013.01)

(58) Field of Classification Search
CPC ... H04L 65/1089; H04L 65/403; G06V 20/40; G10L 15/08
USPC ............................................ 348/14.01–14.16
See application file for complete search history.

(56) References Cited

U.S. PATENT DOCUMENTS

| 10,440,063 | B1 * | 10/2019 | Nevick ................ H04N 21/222 |
| 2018/0352301 | A1 * | 12/2018 | Tofighbakhsh ..... H04N 21/2668 |
| 2022/0046074 | A1 * | 2/2022 | Zhong ................ H04N 21/4542 |
| 2022/0115033 | A1 * | 4/2022 | Huffman .................. G06N 3/08 |

* cited by examiner

*Primary Examiner* — Melur Ramakrishnaiah
(74) *Attorney, Agent, or Firm* — Kilpatrick Townsend & Stockton LLP

(57) ABSTRACT

Techniques for providing trust and safety functionality during virtual meetings are provided. In an example, a method includes establishing a video conference between client devices. The method includes receiving, from a first client device of the client devices, a stream corresponding to the video conference and including one or more items of content. The method further involves applying, to the stream, a machine learning model that is trained to identify inappropriate or harmful content in the stream. The method further includes determining, via the machine learning model, that an item of content in the stream is inappropriate or harmful. The method further includes editing the stream to remove the item of content. The method further includes transmitting the edited stream to the client devices.

20 Claims, 8 Drawing Sheets

PROVIDING TRUST AND SAFETY FUNCTIONALITY DURING VIRTUAL MEETINGS

FIELD

This disclosure generally relates to video conferences. More specifically, but not by way of limitation, this disclosure relates to techniques for providing content moderation and trust and safety functionality during video conferences and other online applications, which includes live video streams.

DETAILED DESCRIPTION

Disclosed techniques relate to providing trust and safety functionality during video conferences. As used herein, video conferences includes, but is not limited to, video streaming, webinars, virtual spaces, and components thereof. For instance, a content moderation application executing on a video conference provider detects, moderates and allows reporting of video conference content including video, audio, and text. The application uses one or more predictive models, machine learning models, or other techniques to detect inappropriate or harmful content or behavior in the video conference. Non-limiting examples of inappropriate content include swearing, offensive language, offensive gestures, or pornographic content.

Once inappropriate or harmful content is identified, action can be taken by the content moderation application or by a moderator. For example, the inappropriate or harmful content can be provided to a moderator for review. The moderator can cause the content to be edited, obfuscated, or removed from the stream entirely. In other cases, the content moderation application can automatically remove or obfuscate the offending content.

Other variations are possible. For instance, a moderator or the content moderation application can limit access to or methods of interaction within the video conference for the client device and/or user responsible for the inappropriate content. In this manner, certain participants can be restricted from using the virtual space to promote personal agendas or circulate inappropriate or harmful content, thereby improving the trust and safety of the video conference and minimizing exposure to such content.

Content moderation settings can be customized by the moderator via a dashboard or by other settings. For instance, a moderator can set different settings for a small group conference compared to a public town-hall virtual event. Once the settings are configured, then content can be identified and/or removed according to the settings. Additional types of content can be identified as offensive, inappropriate or harmful by customizing these content modification settings. In another example, a threshold of offensiveness, inappropriateness or harmfulness can be set, beyond which content is identified or automatically moderated.

Figure 1:
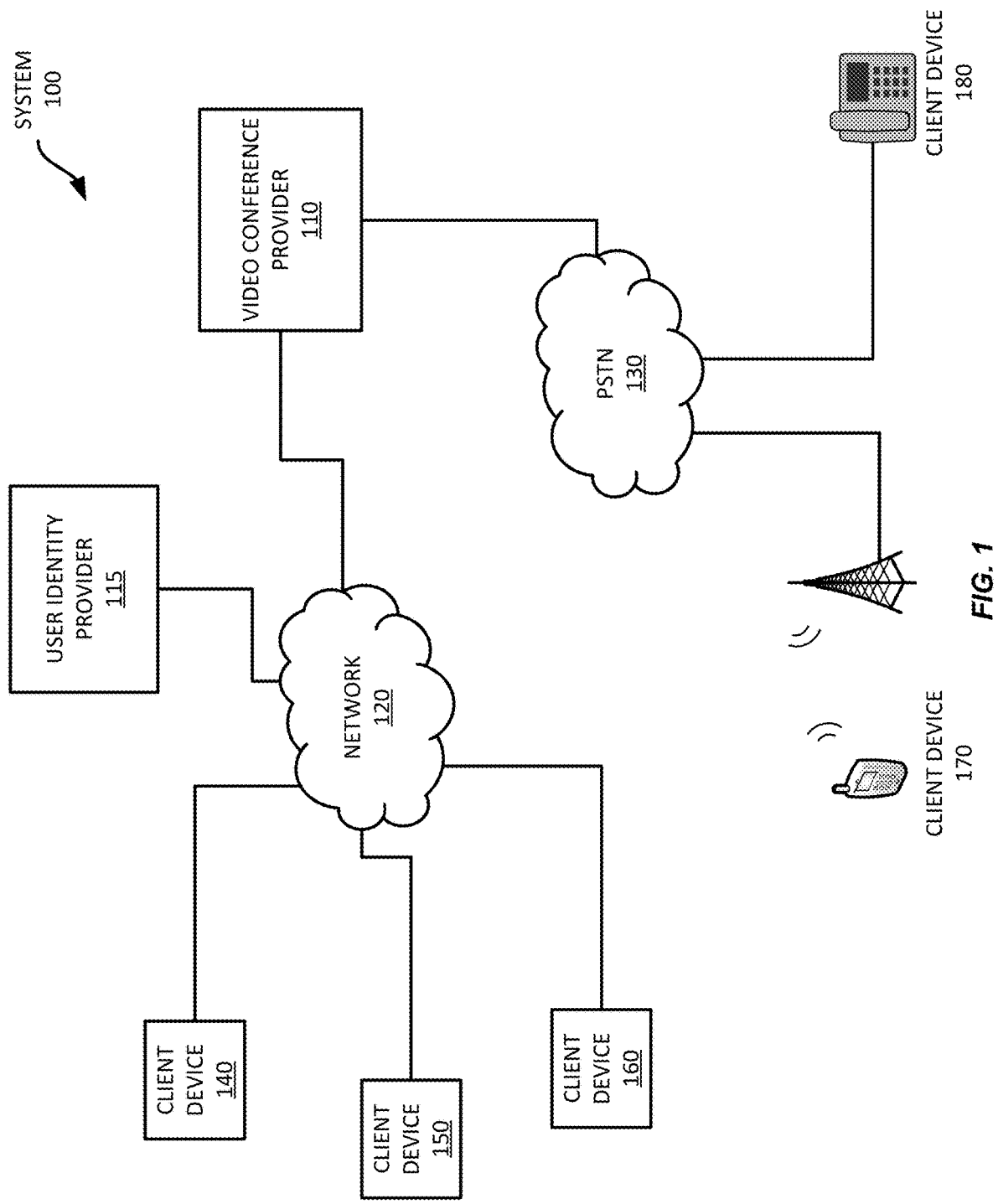
FIG. 1 depicts an example of a system for providing video conferencing functionality to client devices.

Turning now to the Figures, FIG. 1 depicts an example of a system 100 for providing videoconferencing functionality to client devices. In the example depicted by system 100, video conference provider 110 hosts one or more video conferences between client devices 140-180 and optionally performs content moderation of content presented by client devices 140-180 or telephony devices such as cellular telephone 170 and telephone 180 by executing a content moderation application.

The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Other configurations include a hybrid model in which a video conference provider 110 may supply components to enable a private organization to host private internal video conferences or to connect its system to the video conference provider 110 over a public network. Any of client devices 140-180 can be designated a moderator for content moderation purposes. Alternatively, a host can designate another client device as the moderator.

System 100 optionally includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity. In some cases, the identity provider 110 can maintain a database or list of conference users who have a history of transmitting or creating inappropriate or harmful content or their identifying information. In this manner, the video conference provider 110 can verify users of a particular video conference session by querying the identity provider 110. If a problematic user is identified, then the video conference provider 110 can take action such as blocking the user or removing the user from the conference.

Figure 2:
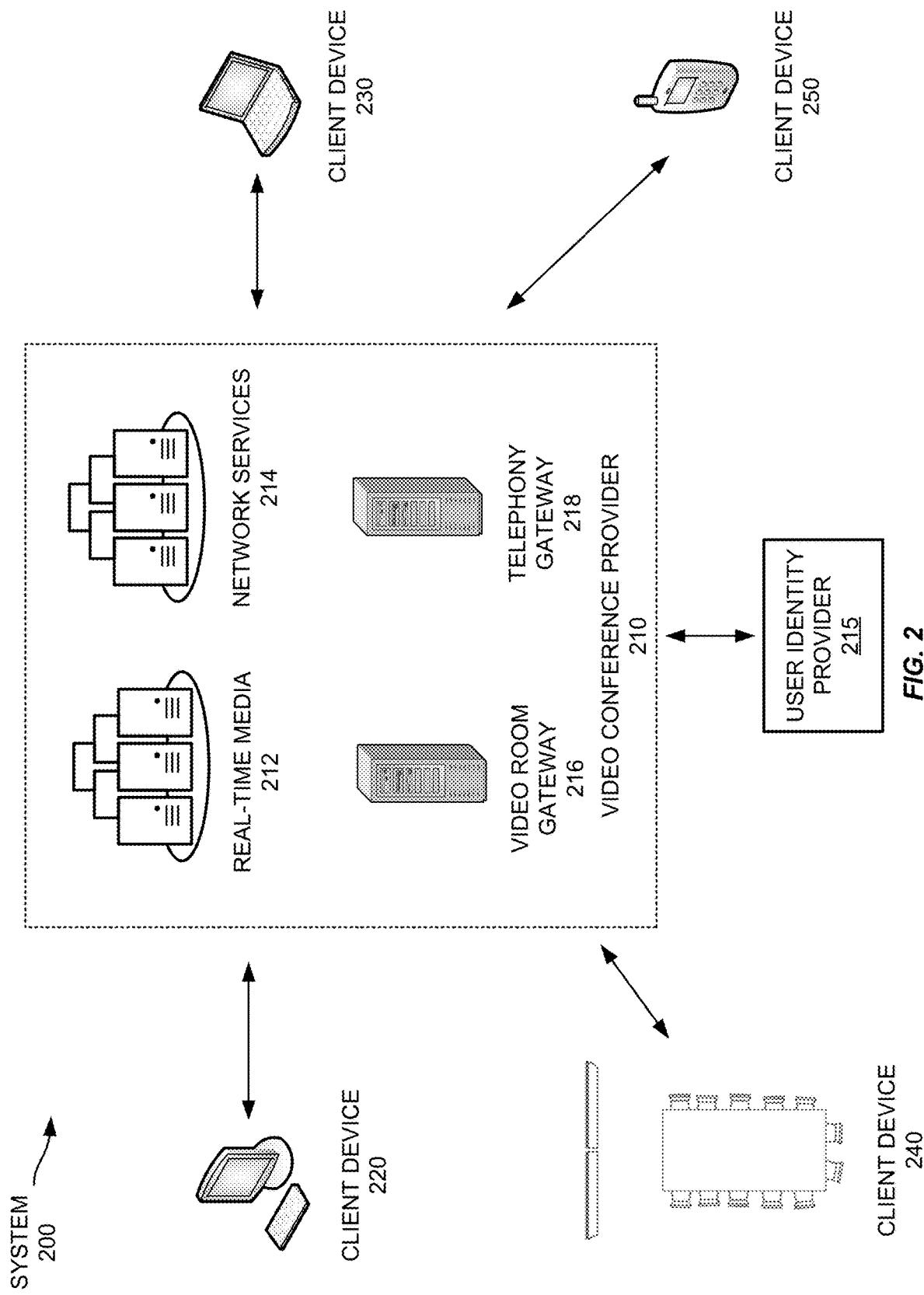
FIG. 2 depicts example of a system in which a video conference provider provides videoconferencing functionality to various client devices.

Video conference provider 110 allows clients to create video conference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the main meeting, etc. FIG. 2, described below, provides a more detailed description of the architecture and functionality of the video conference provider 110. It should be understood that the term "meeting" encompasses the term "webinar,"

"virtual events", "live streaming" and any accompanying "chat" functionality used herein.

Meetings facilitated by video conference provider 110 are provided in virtual rooms to which participants are connected. A room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used. Further, in some examples, and as alluded to above, a meeting may also have "a sidebar meeting." A sidebar meeting as provided herein may be a "room" that is associated with a "main" videoconference room or "main meeting." Content moderation can be performed on sidebar meetings or rooms as appropriate.

To create a meeting with the video conference provider 110, a user may contact the video conference provider 110 using a client device 140-180 and select an option to create a new meeting. Such an option may be provided in a webpage accessed by a client device 140-180 or client application executed by a client device 140-180. For telephony devices, the user may be presented with an audio menu that they may navigate by pressing numeric buttons on their telephony device.

To create a meeting, the video conference provider 110 may prompt the user for certain information, such as a date, time, and duration for the meeting, a number of participants, a type of encryption to use, whether the meeting is confidential or open to the public, whether moderation will be used, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140-180 to enable the various users to participate in the meeting. These audio and video streams can be moderated by video conference provider 110.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode. Additionally or alternatively, at the end of the meeting, the host and/or moderator can save information related to moderation such as whether any inappropriate or harmful content was detected and if so, by which client devices and/or users. Such information can be used to restrict access in subsequent video conferences.

To provide such functionality, one or more client devices 140-180 may communicate with the video conference provider 110 using one or more communication networks, such as communication network 120 or the public switched telephone network ("PSTN") 130. The client devices 140-180 may be any suitable computing or communications device that have audio or video capability. For example, client devices 140-180 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Client devices 140-160 contact the video conference provider 110 using communication network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text messaging or chat with other participants in the meeting.

For client devices 140-180, while content moderation involves analyzing one or more of video, audio, and text (e.g., messaging), for the telephony devices, content moderation does not necessarily include content moderation of video unless a user of those devices has also joined the conference via a computing device or the telephony device includes video capture or display capabilities. Nonetheless, in some cases, telephony users can also connect via computing device. In that case, video and text content can be moderated in addition to audio content provided by the telephony device itself.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110. For instance, in some cases, users or user devices may be restricted based on previous inappropriate or harmful content, e.g., in previous virtual meetings. Therefore, a host may decide to restrict anonymous devices to lower the likelihood that such users join a conference.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

In some cases, content moderation can preclude the use of end-to-end encryption. For instance, when video conference provider 110 performs content moderation, video conference provider 110 may need to decrypt the content. In this case, encryption to/from individual client devices to video conference content provider 110 still can be possible, e.g., after processing.

FIG. 2 depicts an example of a system 200 in which a video conference provider 210 provides video conferencing functionality to various client devices 220-250. The client devices 220-250 include two conventional computing devices 220-230, dedicated equipment for a video conference room 240, and a telephony device 250. Video conference provider 210 provides content moderation functionality.

Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs different servers (or groups of servers) to provide video conference functionality, including content moderation. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

Real-time media servers 212 provide multiplexed multimedia streams to participants, such as client devices 220-250. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex the video from client device 220 and audio feeds when transmitting streams to client device 220. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate or harmful behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Further, given the computational demands of real-time content moderation, multiple real-time multimedia servers 212 can be used for content moderation. For instance if a conference with ten participants uses content moderation, in some instances, the moderation functionality can be implemented across two real-time media servers 212, a first real-time media server 212 handling five streams and a second real-time media servers 212 handing another five streams. Other examples are possible.

Network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services servers 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services servers 214 may accept requests to join the meeting from various users.

To handle requests to join a meeting, the network services servers 214 may receive meeting information, such as a meeting ID and passcode, from one or more client devices 220-250. The network services servers 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services servers 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services servers 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services servers 214.

After joining a meeting, client devices will send and receive multimedia streams via the real-time media servers 212, but they may also communicate with the network services servers 214 as needed during meetings. For example, if the meeting host leaves the meeting, the network services servers 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services servers 214.

For example, if a host wishes to remove a user from a meeting, they may identify the user and issue a command through a user interface on their client device. The command may be sent to a network services server 214, which may then disconnect the identified user from the corresponding real-time media server 212.

In addition to creating and administering on-going meetings, the network services servers 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services servers 214 may deny the request.

Depending on the functionality provided by the video conference provider, the network services servers 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

The telephony gateway servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
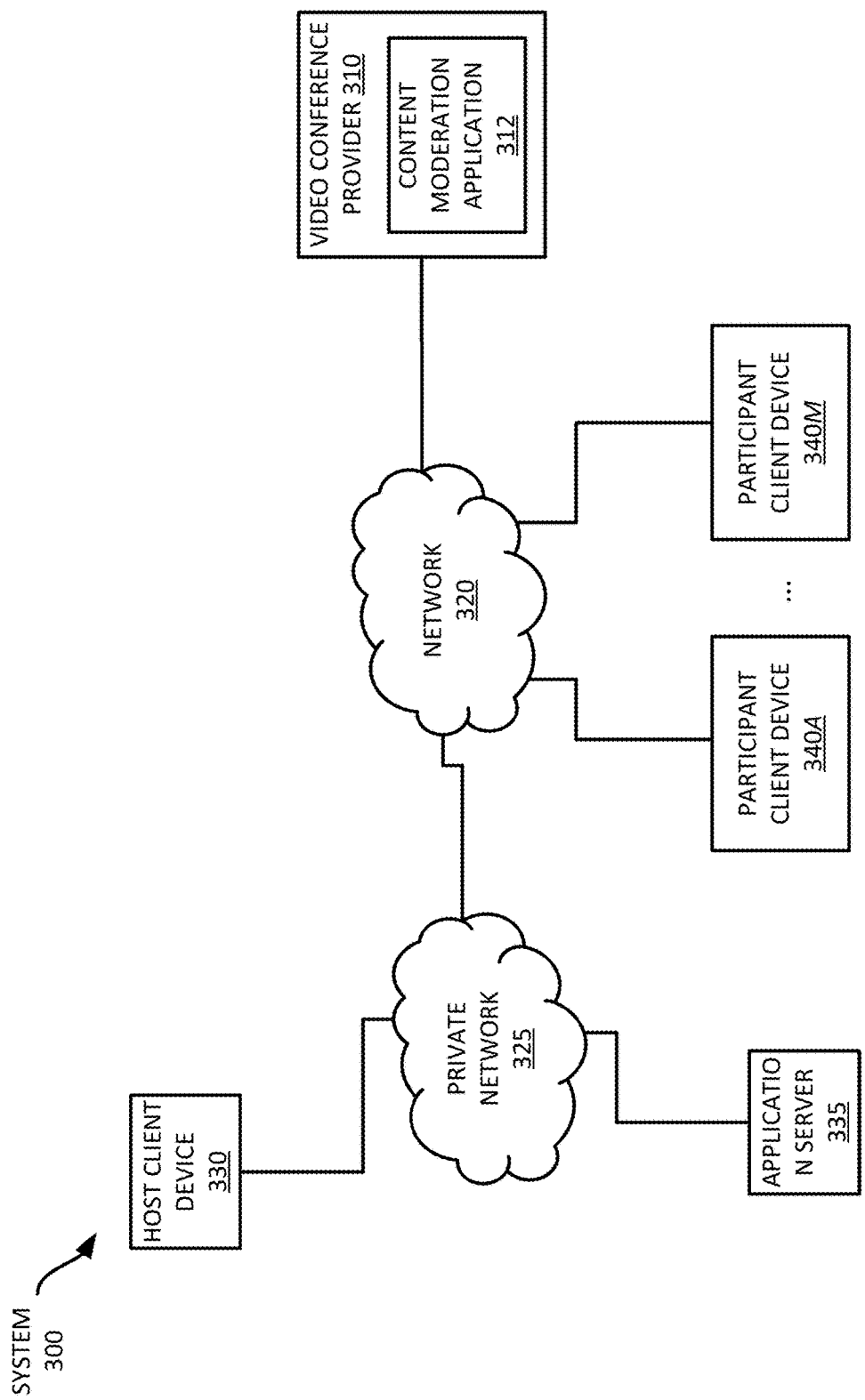
FIG. 3 depicts an example of a system for providing trust and safety functionality during virtual meetings.

FIG. 3 depicts an example of a system 300 for providing trust and safety functionality during virtual meetings. In the example depicted in FIG. 3, a video conference provider 310 provides video conference services, including content moderation services, to multiple different client devices 330 and 340A-M, generally as described above with respect to FIGS. 1 and 2.

Host client device 330 and client devices 340A-M participate in a meeting hosted by the video conference provider 310. Client devices 340A-M connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330.

To start a meeting, the host client device 330 connects to the video conference provider 310 and begins a main meeting ("meeting") at the video conference provider 310, such as by beginning a scheduled meeting, generally as described above with respect to FIGS. 1 and 2. The video conference provider 310 may create and manage the meeting as discussed above.

An organizer of the virtual meeting may wish to moderate content (e.g., video, audio, or messaging). The organizer can configure moderation settings before starting the meeting or at any time during the meeting. For instance, if an initial set of content moderation settings becomes insufficient to accomplish sufficient moderation, then the organizer can increase the content moderation settings during the meeting. The organizer can also delegate moderation to a particular user (a moderator).

Content moderation may be accomplished in part or in whole by video conference provider 310. As such, video conference provider 310 can include conference moderating application 312. Content moderation application 312 can use predictive models or machine learning models to perform content moderation. In some cases, one or more predictive or machine learning models are specific to a particular conference and/or user.

Examples of suitable models include predictive models and classifiers (e.g., linear classifiers, support vector machines (SVM), decision trees, k-nearest neighbor models, and random forest models). The models are used for identifying and/or removing inappropriate or harmful content from a conference stream. Editing of the conference stream can be controlled by the designated moderator or by the content moderation application on an automatic basis.

Once the meeting is started, participants may be able to interact with other participants and see their respective names, such as in close proximity to other participants' video streams or in a list of participants visible in a graphical user interface ("GUI"). In some examples, the participants may only be able to see information, e.g., names or video feeds, from the host(s) of the meeting or certain select participants that will be engaged in discussions during the main meeting, such as panelists in a panel discussion.

Other limits may be imposed on the meeting participants, such as their ability to react to occurrences during the meeting, e.g., participants may be allowed to interact with their GUI to raise their hand to ask a question, but may not be allowed to provide any other feedback. For example, content moderation and/or previous knowledge of a nefarious user can result in a user being restricted. If content moderation application 312 detects that operating participant client device 340B includes a video stream that contains offensive or harmful content, then the moderator and/or the content moderation application 312 can disable the video for participant client device 340B. Similarly, if the content moderation application 312 detects an offensive or harmful audio stream originating from participant client device 340B, then the audio of participant client device 340B may be disabled.

Figure 4:
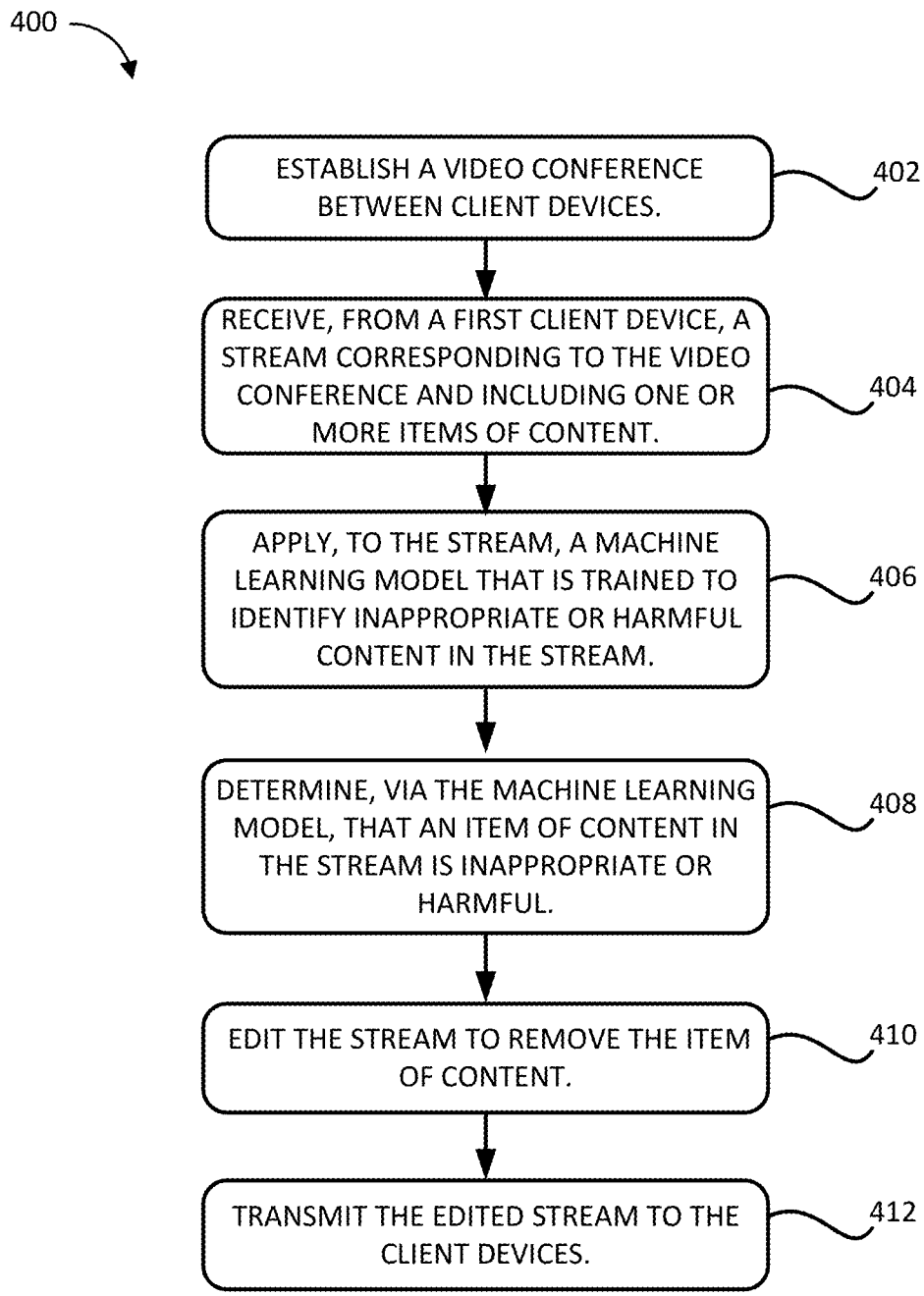
FIG. 4 is a flowchart of an example of a method for providing trust and safety functionality during virtual meetings.

FIG. 4 is a flowchart of an example of a method 400 for providing trust and safety functionality during virtual meetings. As described below, trust and safety functionality includes content moderation and functionality to restrict capabilities of users or devices accordingly. The description of method 400 is made with reference to FIG. 3. However, any suitable system according to this disclosure may be used, such as systems 100 and 200, shown in FIGS. 1 and 2 respectively.

It should be appreciated that method 400 provides a particular method of providing trust and safety functionality during virtual meetings. Other sequences of operations may also be performed. For example, the steps outlined above may be performed in a different order. Moreover, the individual steps illustrated by method 400 may include multiple sub-operations that may be performed in various sequences as appropriate to the individual operation. Furthermore, additional operations may be added or removed depending on the particular applications. One of the ordinary skill in the art would recognize many variations, modifications, and alternatives. For instance, in some cases, some of the conference moderation functionality including executing machine learning models, can be performed by host client device 330 and/or participant devices 340A-M.

At block 402, method 400 involves establishing a video conference between client devices. For example, video conference provider 310 establishes a video conference between host client device 330 and/or participant devices 340A-M, as described further with respect to FIG. 3. Video conference provider 310 receives a stream from the host client device 330 and/or participant devices 340A-M. The stream includes one or more items of content such as video, audio, and messaging.

At block 404, method 400 involves receiving, from a first client device, a stream corresponding to the video conference and including one or more items of content. Continuing the example, participant device 340a transmits a stream corresponding to the video conference to video conference provider 310. In turn, video conference provider 310 receives and analyzes the stream.

The stream may be de-multiplexed into smaller items of content by video conference provider 310 (for instance, as discussed with respect to FIG. 2). Similarly, after processing (including content moderation) is complete, the streams can be re-multiplexed. In other cases, the content may arrive from a client device further subdivided, such as individual streams from each other client device, a segment of video or audio, or an individual message.

At block 406, method 400 involves applying, to the stream, a machine learning model that is trained to identify inappropriate or harmful content in the stream. Continuing the example, content moderation application 312 applies a machine learning model to the stream. The machine learning model is previously trained to detect inappropriate or harmful content. An example method of training is discussed with respect to FIG. 5.

In additional or alternative examples, content moderation application 312 provides individual or de-multiplexed streams (e.g., video, audio, text) to the machine learning model separately. In yet other examples, content moderation application 312 provides the streams to separate, dedicated models. This approach can enable improved results by leveraging models that focus only on one aspect of content, such as video, audio, or text. For example, a first model can be trained to identify pornography in video, a second model to identify rude gestures in video, and a third model to identify offensive or harmful words in text.

In additional or alternative examples, the machine learning model analyzes the stream on a sliding-window basis. For example, a first window of a predetermined number of samples of video, audio, and/or text data is provided to the machine learning model, which proceeds with analysis of the first window. Then, a second window, occurring after or overlapping with the first window, is created and provided to the machine learning model, and so forth. Each window of samples can be a transformed into a feature vector before being provided to the machine learning model.

In additional or alternative examples, the stream data is preprocessed before being provided to the machine learning model. For example in the case of speech data, content moderation application 312 performs speech recognition on the audio content before providing the audio content, e.g., in the form of text, to the machine learning model to identify words in the audio stream. In turn, the words are provided to the machine learning model, which identifies whether the words correspond to inappropriate content. Such analysis can be context-based. For example, while a word may not be offensive or harmful in isolation, it may be offensive or harmful in a larger context. A similar approach can be used for analyzing textual content such as chat messages.

In additional or alternative examples, analysis of text, whether directly from messages or converted from audio, is performed using keyword analysis and without the use of a machine learning model. For instance, content moderation application 312 can maintain a list of keywords that are considered inappropriate or harmful either in isolation or context. Content moderation application 312 can identify inappropriate or harmful content based on a single or greater occurrence of these words.

Libraries of known inappropriate content can be used. Examples include GIFCT, the National Center for Missing and Exploited Children (NCMEC), the International Watch Foundation ("IWF"), the Anti-Defamation League, and so forth. The machine learning model can be trained with such libraries.

In additional or alternative examples, content moderation settings, or a level or threshold of content moderation for a video conference session is configured. The levels can be predetermined or adjusted. For instance, a first level may include illegal material, a second level may include offensive or harmful material that is racially insensitive, and a third level may include the first and second level with the addition of individually offensive words (e.g., swear words).

The models can be updated, or further trained, with feedback from users such that their ability to filter content is improved over time. In this case, the level of content moderation can also be provided to the machine learning model. The content moderation settings are applied to the machine learning model, which in turn identifies one or more of the content based on the content moderation settings.

In another example, one or more models are individually trained or adjusted based on individual users. For example, a model may be trained with objectionable content created by a particular problematic user such that the content can be more easily identified in the future. In some cases, such models can be provided to a client device and can operate locally on the client device, thereby lowering moderation latency.

In yet another example, a machine learning model is trained according to a set of content moderation settings. For instance, if a set of content moderation settings includes restrictions on offensive graphic images but does not include restrictions on audio or speech, then a machine learning model can be trained accordingly and used when appropriate.

At block 408, method 400 involves determining, via the machine learning model, that an item of content in the stream is inappropriate or harmful. Continuing the example, content moderation application 312 receives, from the machine learning model, an output indicating that one or more items of content are inappropriate or harmful. The output can take different forms. For instance, the output could include an identification of the inappropriate or harmful content, e.g., a time stamp or time range of the inappropriate or harmful content. In other cases, the output can include a segment or clip of video, audio, or text that is identified as inappropriate or harmful. In some examples, the identification could be a graphical artifact added to a video stream to identify the inappropriate content or harmful, such as a bounding box or arrow.

In additional or alternative examples, content moderation application 312 analyzes de-multiplexed streams with separate machine learning models. For example, a first model can be used for identifying inappropriate or harmful content in video, a second model for identifying inappropriate or harmful content in audio, and a third model for identifying inappropriate or harmful content in text. In this case, blocks 406 and 408 are executed multiple times, one for each content type (video, audio, text).

At block 410, method 400 involves editing the stream to remove the item of content. Continuing the example, content moderation application 312 edits the stream to remove the item of content that is identified as inappropriate or harmful.

Editing can take different forms. In some cases, editing involves completely or partially removing the inappropriate or harmful item of content in the stream automatically in real time before the stream reaches other client devices. In other cases, the stream is altered such that the inappropriate or harmful item of content is obfuscated. For instance with respect to video, video conference provider 310 can use video editing techniques to remove, such as by replacing pixels corresponding to the content with a black or white pixels, blur, or otherwise alter the inappropriate or harmful item of content.

The editing can be based on feedback from a moderator. For example, the inappropriate or harmful item of content can be transmitted to a moderating client device, e.g., participant client device 340B. In turn, participant client device 340B presents the inappropriate or harmful item of content to the moderator via a dashboard or other settings. The moderator can then take a decision about how, if at all, to edit the inappropriate or harmful item of content. In other cases, the editing is automatically performed by content moderation application 312.

In some cases, when no decision has been taken by the moderator for a threshold amount of time, content moderation application 312 automatically takes action to remove the inappropriate or harmful item of content while maintaining real-time or near-real time functionality of the system.

After any content moderation is applied, system (e.g., real-time media servers 212) multiplex the various edited video and audio streams and communicate the multiplexed streams to each client device. In turn, the client devices receive the stream and perform any decryption, decoding, and de-multiplexing that is necessary on the received streams, and then output the audio and video using the client device's video and audio devices.

Additionally or alternatively, in response to the identification of the item of inappropriate or harmful content, video conference provider 310 can terminate services to a user or device, muting the device, and/or turn off video for a device.

At block 412, method 400 involves transmitting, to the client devices, the edited stream. Generally, with the exception of transmitting the inappropriate or harmful item of content to the moderator device, content corresponding to the inappropriate or harmful item of content is not transmitted to any other client devices until editing has taken place. In some cases, the stream is subject to a live television type delay (e.g., a few seconds) to allow for the moderator or video conference provider 310 to review the content. Once editing has taken place, then video conference provider 310 provides the editing stream to the other client devices, e.g., participant client devices 340B-n and host client device 330, in addition to participant client device 340a. However while this approach may be suitable for webinar-type conferences, a different approach may be helpful for more interactive conferences. For example, in another approach, the video conference provider 310, upon detection of inappropriate or harmful content, blurs, redacts, mutes, or stops the inappropriate or harmful content until a moderator has had an opportunity to review.

In some cases, a level of risk can be calculated for a user, which can in some cases can result in a particular user can be flagged as a problem user. For example, content sent by a user (e.g., video, audio, or text) can be analyzed to determine the level of risk posed by the user. For instance, if inappropriate or harmful content is detected in the stream of the particular user, then the system can identify the user as a higher risk. This risk can be quantified, for instance, on a scale of zero to one-hundred. The calculation of risk can be performed with a classification model.

Additionally, a level of risk can that is tolerated can be defined and/or changed. For example, in some cases, swearing may be considered to be high risk. In other cases, a risk tolerance may be higher.

In some cases, a risk beyond a tolerance can subject the user to further action. For instance, the system can flag a risky user and/or subject the user to additional restrictions in during future conferences. Being a problem user can cause closer scrutiny or content moderation. Accordingly, content moderation settings can be adjusted for particular users. For instance, if a user is known to be a problem user, then content moderation can be more aggressive for this person. An identification of this user can be made on by name, username or other identifier, email address, IP address, or other identifying characteristics.

In some cases, an aggregate level of risk can be calculated for multiple users. This approach can be referred to as "risk scoring." In this approach, the system is configured to recognize patterns of problematic behavior. The system can also learn over time, for example, as the content provided by more users is analyzed.

Figure 5:
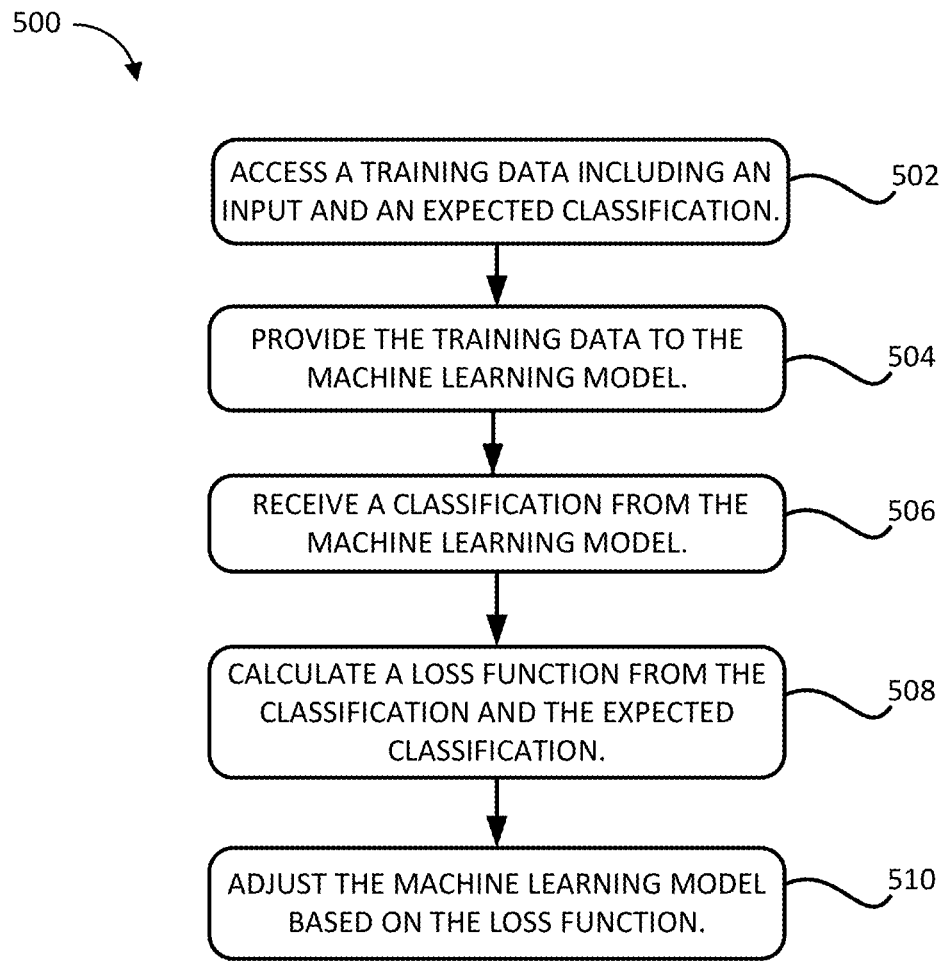
FIG. 5 is a flowchart of an example of a method for training a predictive model to provide trust and safety functionality during virtual meetings.

FIG. 5 is a flowchart of an example of a method for training a predictive model to provide trust and safety functionality during virtual meetings. Different learning techniques, e.g., supervised, unsupervised, and/or reinforcement learning can be used.

For example, with supervised learning, a training dataset includes inputs and correct outputs (classifications), which facilitate learning by the model. Accuracy can be measured via a loss function and the model can be adjusted until an error has been sufficiently minimized.

At block 502, method 500 involves accessing training data including an input and an expected classification. Each training data set includes a reference and an identification. Examples of references include an image or multiple images (video frames), a portion of audio, and text. The tag indicates an expected outcome, in this case, e.g., inappropriate or not appropriate.

At block 504, method 500 involves providing the training data to the machine learning model. The training data is provided to the machine model, typically one set at a time.

At block 506, method 500 involves receiving a classification from the machine learning model. The machine learning model outputs a prediction. A prediction can be binary, for instance, inappropriate or appropriate based on either a predefined or selected rating. In other cases, the output of the machine learning model can be a particular rating, e.g., "general audiences," or "parental guidance recommended," etc. In some cases, the machine learning model can output a confidence level that represents a confidence in a specific classification. For instance, the machine learning model could output a rating of "parental guidance recommended" with an 80% confidence.

At block 508, method 500 involves calculating a loss function from the classification and the expected classification. Continuing the example, the classification received from the model at block 506 is compared against the expected classification.

At block 510, method 500 involves adjusting the machine learning model based on the loss function. The comparison is provided back to the machine learning model such that the machine learning model learns and improves over time. A loss function can be used. For instance, a difference is calculated between a score of the prediction and a score of the expected outcome can be calculated and provided back to the machine learning model. Typically, training is performed iteratively, that is, blocks 504-510 are repeated until the training data is all provided to the model or until the loss function is below a threshold.

In additional or alternative examples, the training of the machine learning model can be updated during runtime. For instance, if a moderator or other user detects that inappropriate or harmful content is present in the conference stream, but that the inappropriate or harmful content has not been identified as such by the system, then the moderator or user can provide this feedback via a dashboard, which in turn causes the system to update the models. Similarly, content may sometimes be erroneously identified as inappropriate. Similarly, in that case, the moderator or user can provide feedback and improve the accuracy of the model.

After training, the machine learning model can receive the stream and/or individual components of the stream as input and in response, determine inappropriate content, for example as discussed above with respect to FIG. 4.

Figure 6:
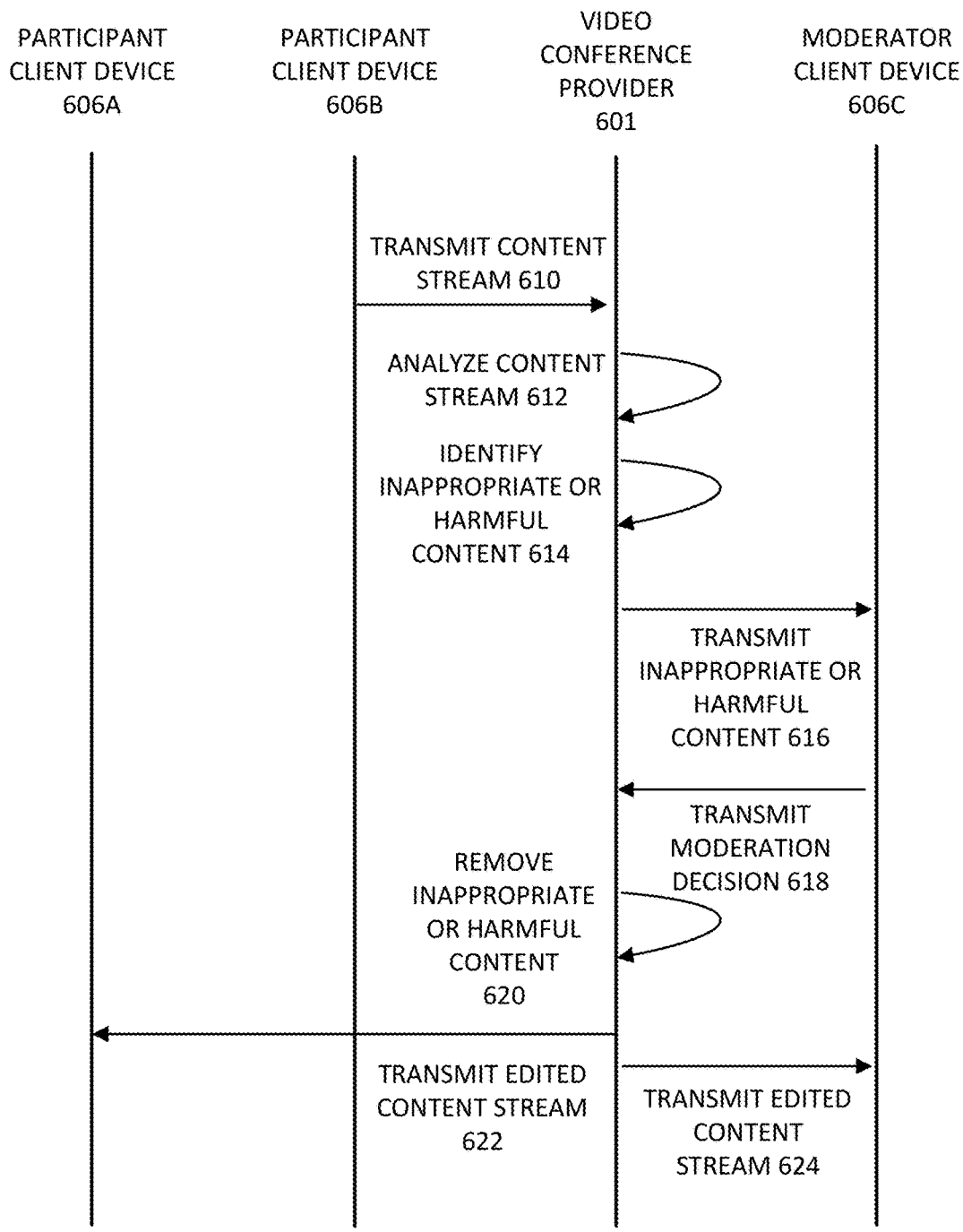
FIG. 6 depicts an example of a sequence of events for providing trust and safety functionality during virtual meetings.

FIG. 6 depicts an example of a sequence of events 600 for providing trust and safety functionality during virtual meetings. Sequence of events 600 depicts interactions occurring as a result of conference moderation in a video conference hosted by video conference provider 601 between client devices 606a, 606b, and 606c. In the example depicted, client device 606c is designated as the moderator. It will be appreciated that sequence of events 600 is merely one example and other examples are possible.

At 610, a content stream is transmitted from participant client device 606b and received by the video conference provider 601, generally as discussed above with respect to block 404.

At 612, video conference provider 601 analyzes the content stream transmitted from participant client device 606b, generally as discussed above with respect to blocks 406 and 408.

At 614, video conference provider 601 identifies inappropriate or harmful content in the content stream. In some cases, action is taken immediately to identify to the user of participant client device 606b that inappropriate or harmful content has been detected and/or to restrict access to the video conference. For example, the audio received by participant client device 606b can be edited to include a warning sound or "beep" or the video preview of the video sent by participant client device 606b can be identified as being subject to moderation, e.g., a "SENT FOR MODERATION" banner across the video preview. In other cases, participant client device 606b can be blocked from participation at all until moderation is complete.

In another example, video conference provider 601 can screen content for differently for different participant client devices. For instance, participant client device 606b can request a "general audience" level of content, whereas other client devices can request a higher, e.g., potentially more offensive, level of content such as "adult." In this manner, different screening occurs for different participant client devices according to their respective preferences. In this example, if participant device 606a transmits mildly offensive content, that content may be flagged for moderation before being displayed on participant device 606a but is not flagged or restricted from transmission to other participant client devices.

At 616, video conference provider 601 transmits the inappropriate or harmful content to moderator client device 606c.

At 618, moderator client device 606c transmits a moderation decision (e.g., whether to moderate and if so, how much) back to video conference provider 601. In the example depicted, moderator client device 606c instructs video conference provider 601 to edit the inappropriate or harmful content in the stream, generally as discussed above with respect to block 410. In turn, video conference provider 601 edits the content in the stream and at 622 and 624 in accordance with the moderation decision, transmits the edited content to the other devices, e.g., participant client device 606a and moderator client device 606c.

Figure 7:
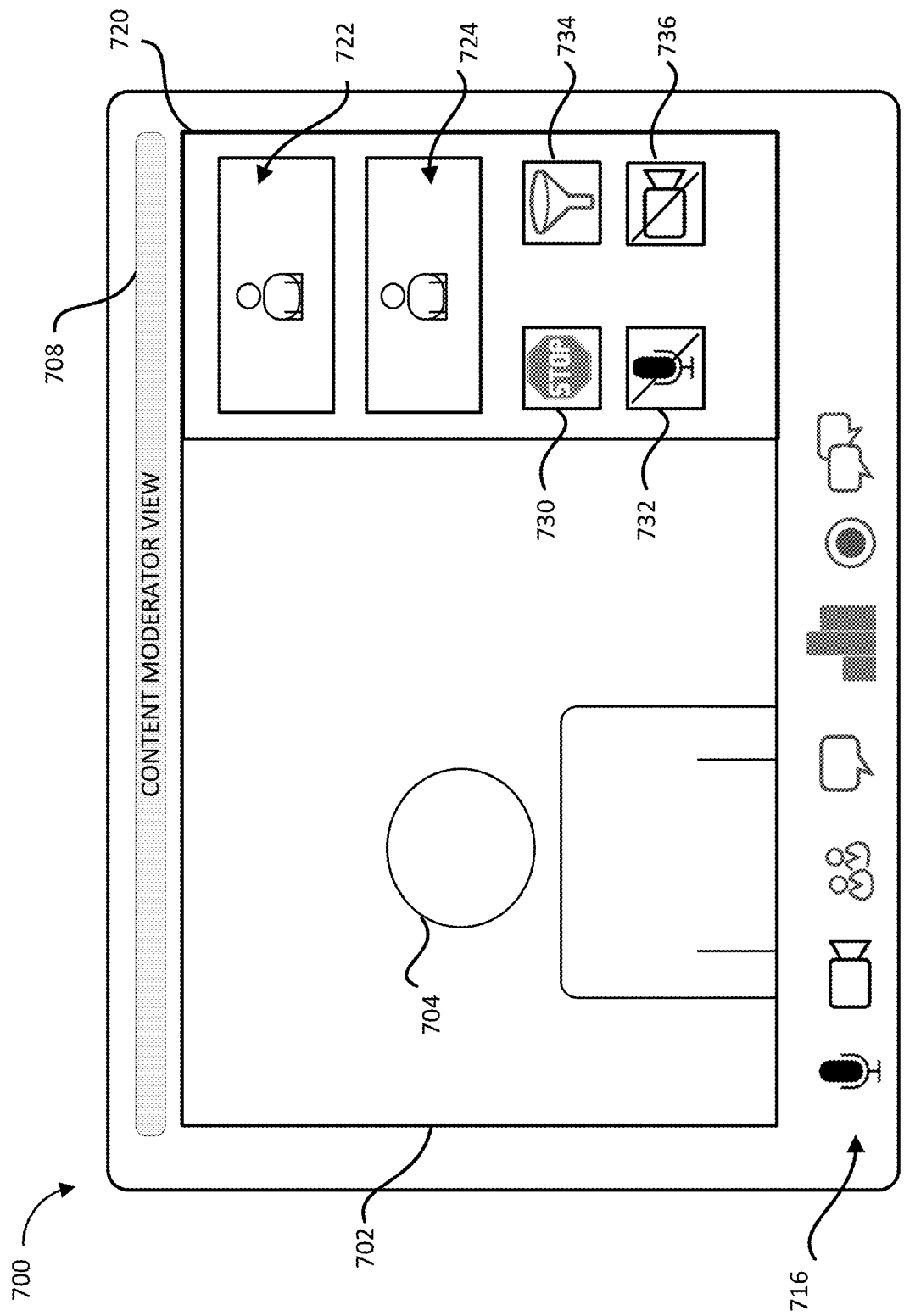
FIG. 7 illustrates a graphical user interface for moderating content in a video conference.

FIG. 7 illustrates a graphical user interface (GUI) 700 for moderating content in a video conference. GUI 700 depicts display 702, which depicts participant 704; indication 708, conference controls 716, and moderator dashboard 720.

Conference controls 716 can include controls such as mute, turn on or off camera, messaging, analytics, recording selection, and so forth. Other controls and elements may be present in other examples. Conference controls 716, which control the moderator's own content, are distinct from the control on moderator dashboard 720, which relate to moderating the content from other client devices.

Moderator dashboard 720 facilitates simple control of the moderation functions and provides the designator moderator the capability to quickly make decisions with respect to inappropriate or harmful content. Moderator dashboard 720 includes preview windows 722 and 724, block 730, audio control 732, filter control 734, and video control 736.

Preview windows 722 and 724 can depict content identified as inappropriate or harmful originating from one or more client devices. For instance, considering the example depicted in FIG. 6, moderating client device 606c displays moderator dashboard 720, with preview windows 722 and 724 depicting inappropriate or harmful content transmitted at 616 from the video conference provider 601. After presentation, the moderator can take action. For example, by clicking on block 730, the moderator can restrict (e.g., force a mute, video off, chat off, etc.) or deny access entirely by the client device responsible for the inappropriate or harmful content. By clicking on audio control 732, the moderator can mute the client device responsible for the inappropriate or harmful content. By clicking on filter control 734, the moderator can remove, blur, or otherwise alter the inappropriate or harmful content identified by content filtering application 312. By clicking on video control 736, the moderator can disable the video from the client device responsible for the inappropriate or harmful content.

Figure 8:
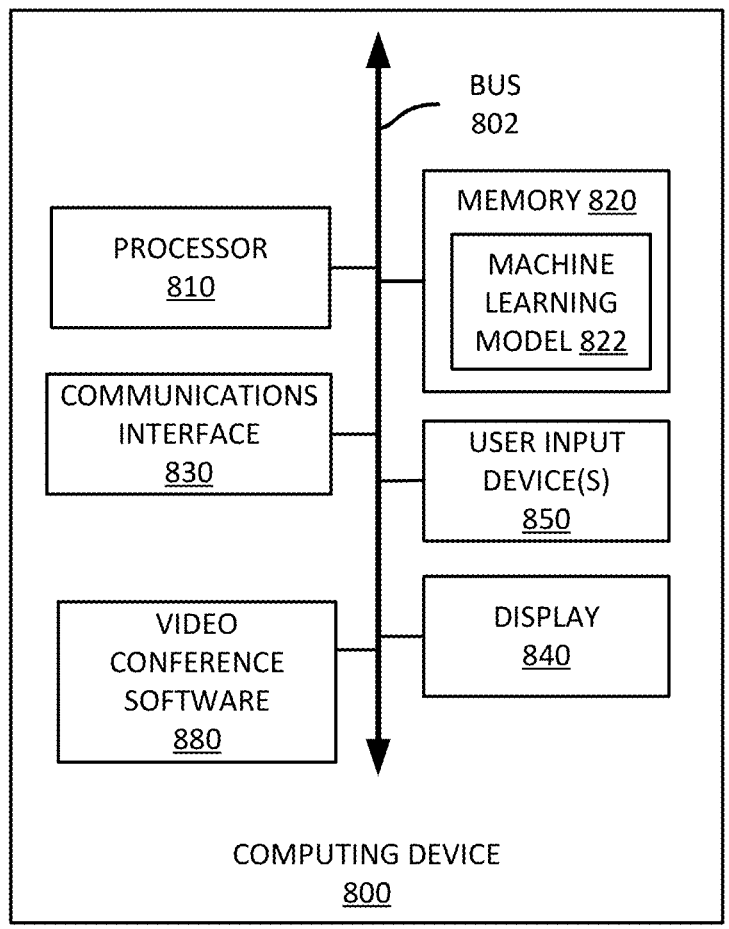
FIG. 8 depicts an example computing device.

FIG. 8 depicts an example computing device 800. Example computing device 800 is suitable for use in example systems or methods for providing a trust and safety functionality during a video conference. The example computing device 800 includes a processor 810 which is in communication with the memory 820 and other components of the computing device 800 using one or more communications buses 802. Memory 820 can include one or more machine learning models that can be used in conjunction with content moderation application 312.

The processor 810 is configured to execute processor-executable instructions stored in the memory 820 to perform one or more methods for providing a trust and safety during a video conference, such as part or all of the example methods 400 or 500, described above. The computing device, in this example, also includes one or more user input devices 850, such as a keyboard, mouse, touchscreen, video input device (e.g., one or more cameras), microphone, etc., to accept user input. The computing device 800 also includes a display 840 to provide visual output to a user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

Illustration 1 is a system for real time and near real time content moderation, the system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish a video conference between a plurality of client devices; receive, from a first client device of the plurality of client devices, a stream corresponding to the video conference and comprising one or more items of content; apply, to the stream, a machine learning model that is trained to identify inappropriate or harmful content in the stream; determine, via the machine learning model, that an item of content in the stream is inappropriate or harmful; edit the stream to remove the item of content; and transmit, to the plurality of client devices, the edited stream.

Illustration 2 is the system of any previous or subsequent illustration, wherein the processor is configured to execute further processor-executable instructions stored in the non-transitory computer-readable medium to: transmit, via the communications interface and to a moderator client device, the item of content; and receive, from the moderator client device, a request to edit the item of content in the stream, wherein the editing is responsive to receiving the request to edit the item of content.

Illustration 3 is the system of any previous or subsequent illustration, wherein the processor is configured to execute further processor-executable instructions stored in the non-transitory computer-readable medium to: receive, from a moderator client device, a set of content moderation settings, wherein applying the machine learning model to the stream further comprises applying the content moderation settings to the machine learning model and wherein the machine learning model identifies the item of content based on the content moderation settings.

Illustration 4 is the system of any previous or subsequent illustration, wherein the one or more items of content include audio and wherein the processor is configured to execute further processor-executable instructions stored in the non-transitory computer-readable medium to: perform speech recognition on the audio content to identify one or more recognized words; and identify, based on the one or more recognized words, one or more keywords corresponding to inappropriate or harmful content.

Illustration 5 is the system of any previous or subsequent illustration, wherein the one or more items of content include text and wherein the machine learning model is trained to: determine that one or more keywords identified as inappropriate or harmful are present in the text; and in response to the determining, identify the content as inappropriate or harmful.

Illustration 6 is the system of any previous or subsequent illustration, wherein the processor is configured to execute further processor-executable instructions stored in the non-transitory computer-readable medium to: in response to the determination of the item of content in the stream being inappropriate, perform one or more of (i) terminating services to a user associated with the first client device, (ii) muting the user, and (iii) turning off video of the user.

Illustration 7 is the system of any previous or subsequent illustration, wherein the processor is configured to execute further processor-executable instructions stored in the non-transitory computer-readable medium to: determine a user of the first client device; calculate a level of risk of the user based on a previous activity of the user; configure content moderation settings in response to the previous activity; and provide the content moderation settings to the machine learning model.

Illustration 8 is the system of any previous or subsequent illustration, wherein the processor is configured to execute further processor-executable instructions stored in the non-transitory computer-readable medium to: receive, from one or more of the plurality of client devices, an indication indicating additional inappropriate or harmful content in the stream; and updating the training of the machine learning model with the indication and the additional content.

Illustration 9 is a method comprising: establishing a video conference between a plurality of client devices; receiving, from a first client device of the plurality of client devices, a stream corresponding to the video conference and comprising one or more items of content; applying, to the stream, a machine learning model that is trained to identify inappropriate or harmful content in the stream; determining, via the machine learning model, that an item of content in the stream is inappropriate or harmful; editing the stream to remove the item of content; and transmitting, to the plurality of client devices, the edited stream.

Illustration 10 is the method of any previous or subsequent illustration, further comprising transmitting, to a moderator client device, the item of content; and receiving, from the moderator client device, a request to edit the item of content in the stream, wherein the editing is responsive to receiving the request to edit the item content.

Illustration 11 is the method of any previous or subsequent illustration, further comprising receiving, from a moderator client device, a set of content moderation settings, wherein applying the machine learning model to the stream further comprises applying the content moderation settings to the machine learning model and wherein the machine learning model identifies the item of content based on the content moderation settings. Illustration 12 is the method of any previous or subsequent illustration, wherein the one or more items of content include audio, the method further comprising: performing speech recognition on the audio content to identify one or more recognized words; and identifying, based on the one or more recognized words, one or more keywords corresponding to inappropriate or harmful content.

Illustration 13 is the method of any previous or subsequent illustration, wherein the one or more items of content include text and wherein the machine learning model is trained to: determine that one or more keywords identified as inappropriate or harmful are present in the text; and in response to the determining, identify the content as inappropriate or harmful.

Illustration 14 is the method of any previous or subsequent illustration, further comprising: in response to the determination of the item of content in the stream being inappropriate, performing one or more of (i) terminating services to a user associated with the first client device, (ii) muting the user, and (iii) turning off video of the user.

Illustration 15 is the method of any previous or subsequent illustration, further comprising: determining a user of the first client device; calculating a level of risk of the user based on a previous activity of the user; configuring content moderation settings in response to the previous activity; and providing the content moderation settings to the machine learning model.

Illustration 16 is a non-transitory computer-readable medium comprising processor-executable instructions configured to cause one or more processors to: establish a video conference between a plurality of client devices; receive, from a first client device of the plurality of client devices, a stream corresponding to the video conference and comprising one or more items of content; apply, to the stream, a machine learning model that is trained to identify inappropriate content in the stream; determine, via the machine learning model, that an item of content in the stream is inappropriate or harmful; edit the stream to remove the item of content; and transmit, to the plurality of client devices, the edited stream.

Illustration 17 is the non-transitory computer-readable medium of any previous or subsequent illustration, wherein the processor-executable instructions are further configured to cause the one or more processors to: receive, from a moderator client device, a set of content moderation settings, wherein applying the machine learning model to the stream further comprises applying the content moderation settings to the machine learning model and wherein the machine learning model identifies the item of content based on the content moderation settings.

Illustration 18 is the non-transitory computer-readable medium of any previous or subsequent illustration, wherein the one or more items of content include audio and wherein the processor-executable instructions are further configured to cause the one or more processors to: perform speech recognition on the audio content to identify one or more recognized words; and identify, based on the one or more recognized words, one or more keywords corresponding to inappropriate content.

Illustration 19 is the non-transitory computer-readable medium of any previous or subsequent illustration, wherein the one or more items of content include text and wherein the processor-executable instructions are further configured to cause the one or more processors to: determine that one or more keywords identified as inappropriate or harmful are present in the text; and in response to the determining, identify the content as inappropriate or harmful.

Illustration 20 is the non-transitory computer-readable medium of any previous or subsequent illustration, wherein the processor-executable instructions are further configured to cause the one or more processors to: receive, from one or more of the plurality of client devices, an indication indicating additional inappropriate or harmful content in the stream; and updating the training of the machine learning model with the indication and the additional content.

That which is claimed is:

1. A system for real-time and near-real time content moderation, the system comprising:
   a non-transitory computer-readable medium;
   a communications interface; and
   a processor communicatively coupled to the non-transitory computer-readable medium and the communications interface, the processor configured to execute processor-executable instructions stored in the non-transitory computer-readable medium to:
   establish a video conference between a plurality of client devices;
   receive, from a first client device of the plurality of client devices, a stream corresponding to the video conference and comprising one or more items of content;
   configure content moderation settings in response to a previous activity of a user associated with the first client device;
   provide the content moderation settings to a machine learning model that is trained to identify inappropriate or harmful content in the stream;
   apply, to the stream, the machine learning model;
   determine, via the machine learning model, that an item of content in the stream is inappropriate or harmful;
   edit the stream to remove the item of content; and
   transmit, to the plurality of client devices, the edited stream.

2. The system of claim 1, wherein the processor is configured to execute further processor-executable instructions stored in the non-transitory computer-readable medium to:
   transmit, via the communications interface and to a moderator client device, the item of content; and
   receive, from the moderator client device, a request to edit the item of content in the stream,
   wherein the editing is responsive to receiving the request to edit the item of content.

3. The system of claim 1, wherein the processor is configured to execute further processor-executable instructions stored in the non-transitory computer-readable medium to:
   receive, from a moderator client device, a set of additional content moderation settings,
   wherein applying the machine learning model to the stream further comprises applying the additional content moderation settings to the machine learning model and wherein the machine learning model identifies the item of content at least in part based on the additional content moderation settings.

4. The system of claim 1, wherein the one or more items of content include audio and wherein the processor is configured to execute further processor-executable instructions stored in the non-transitory computer-readable medium to:
   perform speech recognition on the audio to identify one or more recognized words; and
   identify, based on the one or more recognized words, one or more keywords corresponding to inappropriate or harmful content.

5. The system of claim 1, wherein the one or more items of content include text and wherein the machine learning model is trained to:
   determine that one or more keywords identified as inappropriate or harmful are present in the text; and
   in response to the determining, identify the content as inappropriate or harmful.

6. The system of claim 1, wherein the processor is configured to execute further processor-executable instructions stored in the non-transitory computer-readable medium to:
   in response to the determination of the item of content in the stream being inappropriate, perform one or more of (i) terminating services to a user associated with the first client device, (ii) muting the user, and (iii) turning off video of the user.

7. The system of claim 1, wherein the processor is configured to execute further processor-executable instructions stored in the non-transitory computer-readable medium to:
   calculate a level of risk of the user based on the previous activity, wherein
   the content moderation settings are based on the calculated level of risk.

8. The system of claim 1, wherein the processor is configured to execute further processor-executable instructions stored in the non-transitory computer-readable medium to:
   receive, from one or more of the plurality of client devices, an indication indicating additional inappropriate or harmful content in the stream; and
   updating the training of the machine learning model with the indication and the additional content.

9. The non-transitory computer-readable medium of claim 1, wherein the processor-executable instructions are further configured to cause the one or more processors to:
receive, from a moderator client device, a set of additional content moderation settings,
wherein applying the machine learning model to the stream further comprises applying the additional content moderation settings to the machine learning model and wherein the machine learning model identifies the item of content at least in part based on the additional content moderation settings.

10. A method comprising:
establishing a video conference between a plurality of client devices;
receiving, from a first client device of the plurality of client devices, a stream corresponding to the video conference and comprising one or more items of content;
configuring content moderation settings in response to a previous activity of a user associated with the first client device;
providing the content moderation settings to a machine learning model that is trained to identify inappropriate or harmful content in the stream;
applying, to the stream, the machine learning model;
determining, via the machine learning model, that an item of content in the stream is inappropriate or harmful;
editing the stream to remove the item of content; and
transmitting, to the plurality of client devices, the edited stream.

11. The method of claim 10, further comprising
transmitting, to a moderator client device, the item of content; and
receiving, from the moderator client device, a request to edit the item of content in the stream,
wherein the editing is responsive to receiving the request to edit the item of content.

12. The method of claim 10, further comprising
receiving, from a moderator client device, a set of additional content moderation settings,
wherein applying the machine learning model to the stream further comprises applying the additional content moderation settings to the machine learning model and wherein the machine learning model identifies the item of content at least in part based on the additional content moderation settings.

13. The method of claim 10, wherein the one or more items of content include audio, the method further comprising:
performing speech recognition on the audio to identify one or more recognized words; and
identifying, based on the one or more recognized words, one or more keywords corresponding to inappropriate or harmful content.

14. The method of claim 10, wherein the one or more items of content include text and wherein the machine learning model is trained to:
determine that one or more keywords identified as inappropriate or harmful are present in the text; and
in response to the determining, identify the content as inappropriate or harmful.

15. The method of claim 10, further comprising:
in response to the determination of the item of content in the stream being inappropriate, performing one or more of (i) terminating services to a user associated with the first client device, (ii) muting the user, and (iii) turning off video of the user.

16. The method of claim 10, further comprising:
calculating a level of risk of the user based on the previous activity, wherein the
content moderation settings are based on the calculated level of risk.

17. A non-transitory computer-readable medium comprising processor-executable instructions configured to cause one or more processors to:
establish a video conference between a plurality of client devices;
receive, from a first client device of the plurality of client devices, a stream corresponding to the video conference and comprising one or more items of content;
configure content moderation settings in response to a previous activity of a user associated with the first client device;
provide the content moderation settings to a machine learning model that is trained to identify inappropriate or harmful content in the stream;
apply, to the stream, the machine learning model;
determine, via the machine learning model, that an item of content in the stream is inappropriate or harmful;
edit the stream to remove the item of content; and
transmit, to the plurality of client devices, the edited stream.

18. The non-transitory computer-readable medium of claim 17, wherein the one or more items of content include audio and wherein the processor-executable instructions are further configured to cause the one or more processors to:
perform speech recognition on the audio to identify one or more recognized words; and
identify, based on the one or more recognized words, one or more keywords corresponding to inappropriate or harmful content.

19. The non-transitory computer-readable medium of claim 17, wherein the one or more items of content include text and wherein the processor-executable instructions are further configured to cause the one or more processors to:
determine that one or more keywords identified as inappropriate or harmful are present in the text; and
in response to the determining, identify the content as inappropriate or harmful.

20. The non-transitory computer-readable medium of claim 17, wherein the processor-executable instructions are further configured to cause the one or more processors to:
receive, from one or more of the plurality of client devices, an indication indicating additional inappropriate or harmful content in the stream; and
updating the training of the machine learning model with the indication and the additional content.

* * * * *